(12) United States Patent
Kwon et al.

(10) Patent No.: US 10,071,704 B2
(45) Date of Patent: Sep. 11, 2018

(54) APPARATUS AND METHOD FOR FOLDING DRIVER AIRBAG

(71) Applicant: HYUNDAI MOBIS Co., Ltd., Yongin-si, Gyeonggi-do (KR)

(72) Inventors: Oh Koang Kwon, Yongin-si (KR); Jung Geun Choi, Yongin-si (KR)

(73) Assignee: HYUNDAI MOBIS Co., Ltd., Yongin-si (KR)

(*) Notice: Subject to any disclaimer, the term of this patent is extended or adjusted under 35 U.S.C. 154(b) by 454 days.

(21) Appl. No.: 14/791,517

(22) Filed: Jul. 6, 2015

(65) Prior Publication Data

US 2016/0023627 A1 Jan. 28, 2016

(30) Foreign Application Priority Data

Jul. 25, 2014 (KR) .................. 10-2014-0095020
Sep. 23, 2014 (KR) .................. 10-2014-0126814
Oct. 23, 2014 (KR) .................. 10-2014-0144325

(51) Int. Cl.
*B60R 21/237* (2006.01)

(52) U.S. Cl.
CPC .... *B60R 21/237* (2013.01); *B60R 2021/2375* (2013.01)

(58) Field of Classification Search
CPC ... B60R 21/237; B60R 21/2375; B65H 45/12; B65B 25/145; B65B 63/02; B65B 63/022; B65B 63/026; B65B 63/028; A61F 13/551; A61F 13/55105; A61F 13/5511; A61F 13/55115; A61F 13/5513; A61F 13/55135; A61F 13/5514; A61F 13/5516; A61F 13/55165; A61F 13/55175

USPC ....... 493/440, 449, 405, 407, 408, 455, 457; 53/429, 529, 530; 100/232, 242

See application file for complete search history.

(56) References Cited

U.S. PATENT DOCUMENTS

| 5,795,284 A | 8/1998 | Berti |
| 5,800,328 A * | 9/1998 | Berti ............... B60R 21/237 280/728.1 |
| 5,803,892 A * | 9/1998 | Marotzke ........ B60R 21/237 493/451 |

(Continued)

FOREIGN PATENT DOCUMENTS

| CN | 1129649 A | 8/1996 |
| CN | 102874204 A | 1/2013 |

(Continued)

OTHER PUBLICATIONS

Dec. 5, 2016, Chinese Office Action for related CN application No. 201510436984.2.

(Continued)

*Primary Examiner* — Stephen F Gerrity
*Assistant Examiner* — Joshua Kotis
(74) *Attorney, Agent, or Firm* — Paratus Law Group, PLLC

(57) ABSTRACT

Provided are an apparatus and a method for folding a driver airbag which are capable of folding an airbag so that the airbag has a shape corresponding to a shape of an accommodating space in an airbag housing. To this end, an upper plate of the apparatus for folding the driver airbag according to the exemplary embodiment of the present invention includes a plurality of stair sections that is spaced apart from a lower plate at different vertical distances.

17 Claims, 18 Drawing Sheets

(56) References Cited

U.S. PATENT DOCUMENTS

| | | | |
|---|---|---|---|
| 5,984,852 A | 11/1999 | Heudorfer et al. | |
| 6,115,998 A * | 9/2000 | Reh | B60R 21/237 |
| | | | 53/429 |
| 6,152,867 A | 11/2000 | Heudorfer et al. | |
| 6,248,052 B1 | 6/2001 | Kleeberger et al. | |
| 6,305,150 B1 | 10/2001 | Dietsch | |
| 6,623,034 B2 * | 9/2003 | Dietsch | B60R 21/237 |
| | | | 280/743.1 |
| 8,337,377 B2 * | 12/2012 | Buchholz | B60R 21/237 |
| | | | 493/405 |
| 2005/0127652 A1 | 6/2005 | Krygier | |
| 2005/0209080 A1 | 9/2005 | Nishijima et al. | |
| 2007/0096448 A1 | 5/2007 | Yokoyama et al. | |
| 2010/0069866 A1 * | 3/2010 | Binner | A61F 13/2051 |
| | | | 604/378 |
| 2013/0017942 A1 | 1/2013 | Ko | |

FOREIGN PATENT DOCUMENTS

| | | |
|---|---|---|
| DE | 19535564 A1 | 3/1997 |
| DE | 102011115329 A1 | 1/2013 |
| JP | H11-334511 A | 12/1999 |
| JP | 2008-168673 A | 7/2008 |

OTHER PUBLICATIONS

German Office Action for related DE application No. 10 2015 111 872.6 dated May 29, 2018 from German Patent Office.

* cited by examiner

APPARATUS AND METHOD FOR FOLDING DRIVER AIRBAG

CROSS-REFERENCE TO RELATED APPLICATIONS

The present application claims priority to Korean Patent Application Number 10-2014-0095020 filed Jul. 25, 2014 and 10-2014-0126814 filed Sep. 23, 2014 and 10-2014-0144325 filed Oct. 23, 2015, the entire contents of which the application is incorporated herein for all purposes by this reference.

TECHNICAL FIELD

The present invention relates to an apparatus and a method for folding a driver airbag, and more particularly, to an apparatus and a method for folding a driver airbag that is accommodated in an airbag housing mounted in a steering wheel and inflated at the time of a vehicle accident to protect a driver using cushioning force.

BACKGROUND

In general, airbag apparatuses, which are safety apparatuses having an airbag that is inflated by being supplied with gas from an inflator to protect an occupant at the time of a vehicle accident, are provided in a vehicle, and a driver airbag apparatus is provided as a representative airbag apparatus.

The driver airbag apparatus includes the inflator which generates gas, and an airbag which is connected with the inflator and inflated and deployed when the gas flows into the airbag to protect a driver.

A retainer for coupling the airbag to an airbag housing is disposed in the airbag. An inflator hole into which the inflator is inserted is formed in the retainer, such that when a head portion of the inflator is inserted into the inflator hole, and thereafter, the inflator and the retainer are fastened to the airbag housing by bolting, the airbag and the inflator are then coupled to the airbag housing.

The airbag of the driver airbag apparatus is folded and accommodated in an airbag housing disposed in a steering wheel, and the airbag is inflated and deployed while being unfolded when gas generated by the inflator flows into the airbag, thereby protecting the driver.

In this case, the airbag housing has various shapes in accordance with the type of steering wheel, and thus, an accommodating space of the airbag housing, which accommodates the airbag, also has various shapes.

Therefore, if the airbag of the driver airbag apparatus is folded to have a single shape and the airbag is folded and accommodated in the accommodating space of the airbag housing having various shapes, a vacant space is present between the accommodated airbag and the airbag housing, and as a result, the airbag cannot be normally deployed, and the abnormal deployment has an adverse effect on deployment performance of the airbag.

SUMMARY

The present invention has been made in an effort to provide an apparatus and a method for folding a driver airbag which are capable of folding an airbag so that the airbag has a shape corresponding to a shape of an accommodating space in an airbag housing.

Technical problems of the present invention are not limited to the aforementioned technical problem, and other technical problems, which are not mentioned above, may be clearly understood by those skilled in the art from the following descriptions.

An exemplary embodiment of the present invention provides an apparatus for folding a driver airbag, including: a lower plate on which an airbag to be folded is placed and which is formed to be flat; an upper plate which covers the airbag placed on the lower plate in a state in which the upper plate is spaced upward from the airbag; a plurality of first pressing jigs which is inserted between the upper plate and the lower plate and divides the airbag into a plurality of sections in a circumferential direction by pressing an edge of the airbag inward; and a plurality of second pressing jigs which is inserted between the upper plate and the lower plate and compresses the airbag by pressing inward the edge of the airbag that is divided into the plurality of sections by the plurality of first pressing jigs, in which the upper plate includes a plurality of stair sections that is spaced apart from the lower plate at different vertical distances.

Another exemplary embodiment of the present invention provides a method of folding a driver airbag, including: a first step in which an airbag is spread out on a lower plate and a fixing jig fixes a retainer disposed in the airbag; a second step in which an upper plate covers the airbag in a state in which the upper plate is spaced upward from the airbag; a third step in which a plurality of first pressing jigs is inserted between the upper plate and the lower plate and divides the airbag into a plurality of sections in a circumferential direction by pressing an edge of the airbag inward; a fourth step in which a plurality of second pressing jigs is inserted between the upper plate and the lower plate and compresses the airbag by pressing inward the edge of the airbag that is divided into the plurality of sections; a fifth step in which an outer pusher and an inner pusher are moved downward and compress the airbag by pressing an upper surface of the compressed airbag, and thereafter, the outer pusher is further moved downward than the inner pusher and presses the edge of the compressed airbag; and a sixth step in which the outer pusher, the inner pusher, and the fixing jig are moved downward and allow the compressed airbag to be accommodated in an airbag housing.

Other detailed matters of the exemplary embodiment are included in the detailed description and the drawings.

According to the apparatus and the method for folding the driver airbag according to the exemplary embodiments of the present invention, the airbag may be folded to have a shape corresponding to a shape of the accommodating space in the airbag housing.

The effect of the present invention is not limited to the aforementioned effect, and other effects, which are not mentioned above, will be clearly understood by those skilled in the art from the claims.

DETAILED DESCRIPTION

Figure 1:
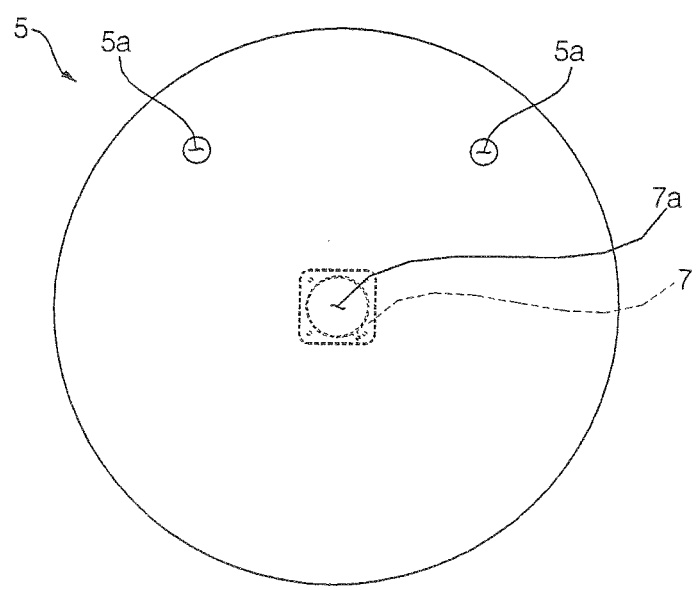
FIG. 1 is a rear view illustrating an airbag that is folded by an apparatus for folding a driver airbag according to a first exemplary embodiment of the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an apparatus for folding a driver airbag according to exemplary embodiments of the present invention will be described with reference to the drawings.

Referring to FIG. 1, a driver airbag 5, which is folded by an apparatus for folding a driver airbag according to a first exemplary embodiment of the present invention, is formed in a circular shape. A retainer 7 is disposed at a central portion of a rear surface of the airbag 5 so as to be inserted into the airbag 5. The airbag 5 is folded and then accommodated in an airbag housing, and the retainer 7 couples the airbag 5 to the airbag housing. An inflator hole 7a is formed at a center of the retainer 7. A head portion of an inflator is inserted into the inflator hole 7a, and then the inflator is fastened to the airbag housing together with the retainer 7.

The inflator is configured to generate gas at the time of a vehicle accident and supply the gas to the airbag 5 so that the airbag 5 may be inflated. Vent holes 5a through which gas generated by the inflator is discharged are formed in the rear surface of the airbag 5. The gas is discharged through the vent holes 5a while the airbag 5 is being inflated as the gas generated by the inflator flows into the airbag 5, thereby maintaining pressure that is appropriate to protect a driver.

The airbag housing is configured to accommodate the airbag 5 and to be mounted in a steering wheel in a vehicle. The airbag housing is formed in various shapes such as a circular shape or a triangular shape according to the type of steering wheel, and as a result, an accommodating space in which the airbag 5 is accommodated may also be formed in various shapes. Therefore, the airbag 5 needs to be folded so as to be matched with the accommodating space in the airbag housing having various shapes. The apparatus for folding the driver airbag according to the first exemplary embodiment of the present invention may fold the airbag 5 so that the airbag 5 is matched with the accommodating space in the airbag housing having various shapes.

Referring to FIGS. 2 to 8, an apparatus 100 for folding the driver airbag according to the first exemplary embodiment of the present invention includes a lower plate 10 on which the airbag 5 to be folded is placed, an upper plate 20 which covers the airbag 5 in a state in which the upper plate 20 is spaced upward from the airbag 5 placed on the lower plate 10, a fixing jig 30 which fixes a central portion of the airbag 5 placed on the lower plate 10, a plurality of first pressing jigs 50 which is inserted between the upper plate 20 and the lower plate 10 and divides the airbag 5 into a plurality of sections in a circumferential direction by pressing an edge of the airbag 5 inward, a plurality of second pressing jigs 60 which is inserted between the upper plate 20 and the lower plate 10 and compresses the airbag 5 by pressing inward the edge of the airbag 5 that is divided into the plurality of sections by the plurality of first pressing jigs 50, and a pusher 70 which compresses the airbag 5 by pressing an upper surface of the airbag 5 that is compressed by the plurality of second pressing jigs 60.

The lower plate 10 has a larger area than the upper plate 20, is formed to be flat, and is installed on a table 1.

A fixing jig hole 15 through which the fixing jig 30 passes is formed in the lower plate 10. The rear surface of the airbag 5 on which the retainer 7 is disposed is placed on an upper surface of the lower plate 10. In this case, the airbag 5 is disposed so that the inflator hole 7a formed in the retainer 7 is in communication with the fixing jig hole 15.

The fixing jig 30 is disposed below the lower plate 10 so as to be movable vertically. The fixing jig 30 is moved upward such that an upper portion of the fixing jig 30 is inserted into the fixing jig hole 15 and then inserted into the inflator hole 7a formed in the retainer 7 to fix the retainer 7, thereby fixing the airbag 5. The fixing jig 30 may be moved vertically by being connected with a cylinder device that is operated by pneumatic pressure or hydraulic pressure.

The upper plate 20 is formed to have a smaller area than the lower plate 10. The upper plate 20 is formed in a circular shape that is identical to the shape of the airbag 5. The upper plate 20 is installed on a support frame 3 installed on the table 1 so as to be movable vertically, and disposed above the lower plate 10. The upper plate 20 may also be moved vertically by being connected with a cylinder device that is operated by pneumatic pressure or hydraulic pressure.

The upper plate 20 is formed in a circular shape having a size that may allow the upper plate 20 to cover the airbag 5 placed on the lower plate 10. Here, the covering of the airbag 5 placed on the lower plate 10 does not means a state in which the upper plate 20 completely covers the airbag 5, but means a state in which the upper plate 20 is disposed to be spaced upward from the lower plate 10 so that the first pressing jigs 50 and the second pressing jigs 60 may be inserted into the lower plate 10 and the upper plate 20, and the upper plate 20 covers the airbag 5 so that the airbag 5 does not become convex upward when the airbag 5 is pressed by the first pressing jigs 50 and the second pressing jigs 60.

A pusher hole 25 through which the pusher 70 passes is formed at a central portion of the upper plate 20. After the second pressing jigs 60 compress the airbag 5, the pusher 70 is moved downward such that a lower portion of the pusher 70 passes through the pusher hole 25 and compresses the airbag 5 while pressing the upper surface of the compressed airbag 5. A recessed portion 71 is formed in a lower surface of the pusher 70 which comes into contact with the upper surface of the airbag 5. When the lower surface of the pusher 70 presses the upper surface of the airbag 5, the upper surface of the airbag 5 is compressed to have a shape corresponding to a shape of the lower surface of the pusher 70. At least one recessed portion 71 may be formed in the lower surface of the pusher 70 in accordance with the shape of the accommodating space in the airbag housing 2.

Similar to the upper plate 20, the pusher 70 is installed on the support frame 3 so as to be movable vertically, and disposed above the upper plate 20. The pusher 70 may also be moved vertically by being connected with a cylinder device that is operated by, pneumatic pressure or hydraulic pressure.

An operation of folding the airbag 5 is completed as the pusher 70 presses and compresses the upper surface of the airbag 5. When the operation of folding the airbag 5 is completed, the pusher 70 is moved downward together with the fixing jig 30 so that the airbag 5 may be accommodated in the airbag housing 2. Since the pusher 70 is moved downward together with the fixing jig 30, the folded airbag 5 disposed between the pusher 70 and the fixing jig 30 may be withdrawn downward through the fixing jig hole 15 formed in the lower plate 10 without being unfolded, and then may be accommodated in the airbag housing 2.

The airbag housing 2 may be disposed below the lower plate 10 so that the airbag 5 may pass through the fixing jig hole 15 and then may be accommodated in the airbag housing 2 as the pusher 70 and the fixing jig 30 are moved downward.

The upper portion of the fixing jig 30 passes through the airbag housing 2, is inserted into the fixing jig hole 15 formed in the lower plate 10, and then is inserted into the inflator hole 7a formed in the retainer 7 disposed on the airbag 5, thereby fixing the retainer 7. Since the fixing jig 30 passes through the airbag housing 2 as described above, when the fixing jig 30 is moved downward, the folded airbag 5 disposed on the fixing jig 30 may be guided by the fixing jig 30 and accommodated in the airbag housing 2.

As described above, since the completely folded airbag 5 is moved downward by the pusher 70 and the fixing jig 30 and instantly accommodated in the airbag housing 2, a process of folding the airbag 5 and a process of accommodating the airbag 5 may be incorporated. That is, in the related art, the airbag 5 is folded in a process of folding the airbag 5, the airbag 5 is encapsulated in a cushion cover so as not to be unfolded, the airbag 5 is conveyed to a process of accommodating the airbag 5, and in the process of accommodating the airbag 5, the airbag 5 encapsulated in the cushion cover is inserted into and accommodated in the airbag housing 2 together with the cushion cover. However, the airbag 5 folded by the apparatus for folding the driver airbag according to the first exemplary embodiment of the present invention is instantly accommodated in the airbag housing 2, and as a result, the process of folding the airbag 5 and the process of accommodating the airbag 5 are incorporated, thereby simplifying the process.

The plurality of first pressing jigs 50 and the plurality of second pressing jigs 60 are alternately disposed above the lower plate 10 in the circumferential direction of the airbag 5, and may press the edge of the airbag 5 inward. The plurality of first pressing jigs 50 and the plurality of second pressing jigs 60 are configured as cylinder devices that are operated by pneumatic pressure or hydraulic pressure, and may press the edge of the airbag 5 while being rectilinearly moved above the lower plate 10. In the present exemplary embodiment, six first pressing jigs 50 are provided and disposed at an equal interval in the circumferential direction of the airbag 5, and six second pressing jigs 60 are also provided and disposed at an equal interval in the circumferential direction of the airbag 5.

A first blade 55, which presses the edge of the airbag 5 inward to divide the airbag 5 into the plurality of sections in the circumferential direction, is disposed at a tip of the first pressing jig 50, and a second blade 65, which compresses the airbag 5 by pressing inward the edge of the airbag 5 that is divided into the plurality of sections by the first blade 55, is disposed at a tip of the second pressing jig 60.

The first blade 55 and the second blade 65 may be formed to have vertical lengths that may allow the first blade 55 and the second blade 65 to be inserted between the lower plate 10 and the upper plate 20.

A tip of the first blade 55, which comes into contact with the edge of the airbag 5, may be formed to be pointed to come into line-to-line contact with the edge of the airbag 5, may be formed to have a flat surface to come into surface-to-surface contact with the edge of the airbag 5, or may be formed to have a curved surface to come into surface-to-surface contact with the edge of the airbag 5. The shape of the tip of the first blade 55 may be variously changed in accordance with the shape of the accommodating space in the airbag housing 2.

Since the second blade 65 compresses the airbag 5 by pressing the edge of the airbag 5 inward, a tip of the second blade 65, which comes into contact with the edge of the airbag 5, needs to come into surface-to-surface contact with the edge of the airbag 5. Therefore, the tip of the second blade 65 may be formed to have a flat surface to come into surface-to-surface contact with the edge of the airbag 5, or may be formed to have a curved surface to come into surface-to-surface contact with the edge of the airbag 5. The shape of the tip of the second blade 65 may be variously changed in accordance with the shape of the accommodating space in the airbag housing 2.

Meanwhile, the upper plate 20 includes a plurality of stair sections 20a, 20b, 20c, 20d, 20e, and 20f which is spaced apart from the lower plate 10 at different vertical distances. Here, the vertical distance between the upper plate 20 and the lower plate 10 means a vertical distance between the upper surface of the lower plate 10 and a lower surface of the upper plate 20. The number of stair sections 20a, 20b, 20c, 20d, 20e, and 20f is six corresponding to the number of first pressing jigs 50 and the number of second pressing jigs 60. In the present exemplary embodiment, all of the six stair sections 20a, 20b, 20c, 20d, 20e, and 20f are spaced apart from the lower plate 10 at different vertical distances, but the vertical distances are not particularly limited as long as at least two stair sections of the six stair sections 20a, 20b, 20c, 20d, 20e, and 20f are spaced apart from the lower plate 10 at different vertical distances.

The number of the plurality of stair sections 20a, 20b, 20c, 20d, 20e, and 20f and the vertical distances at which the plurality of stair sections 20a, 20b, 20c, 20d, 20e, and 20f is spaced apart from the lower plate 10 may be variously changed in accordance with a shape and a height of a side wall of the airbag housing 2. That is, the number of the plurality of stair sections 20a, 20b, 20c, 20d, 20e, and 20f and the distances at which the plurality of stair sections 20a, 20b, 20c, 20d, 20e, and 20f is spaced apart from the lower plate 10 correspond to the shape and the height of the side wall of the airbag housing 2. The shape of the airbag 5 being compressed between the upper plate 20 and the lower plate 10 may be changed by changing the number of plurality of stair sections 20a, 20b, 20c, 20d, 20e, and 20f or changing the distances at which the stair sections 20a, 20b, 20c, 20d, 20e, and 20f are spaced apart from the lower plate 10, and as a result, the airbag 5 may be folded to have a shape corresponding to the shape of the airbag housing 2. As described above, the upper plate 20 includes the plurality of stair sections 20a, 20b, 20c, 20d, 20e, and 20f that is spaced apart from the lower plate 10 at different vertical distances, such that the airbag 5 may be folded to have a shape corresponding to the shape of the airbag housing 2.

The first blades 55 are formed to have vertical lengths corresponding to the vertical distances at which the plurality of stair sections 20a, 20b, 20c, 20d, 20e, and 20f is spaced apart from the lower plate 10. In the present exemplary embodiment, since all of the stair sections 20a, 20b, 20c, 20d, 20e, and 20f are spaced apart from the lower plate 10 at different vertical distances, the first blades 55, which are disposed at the tips of the plurality of first pressing jigs 50, respectively, have different vertical lengths.

Figure 2:
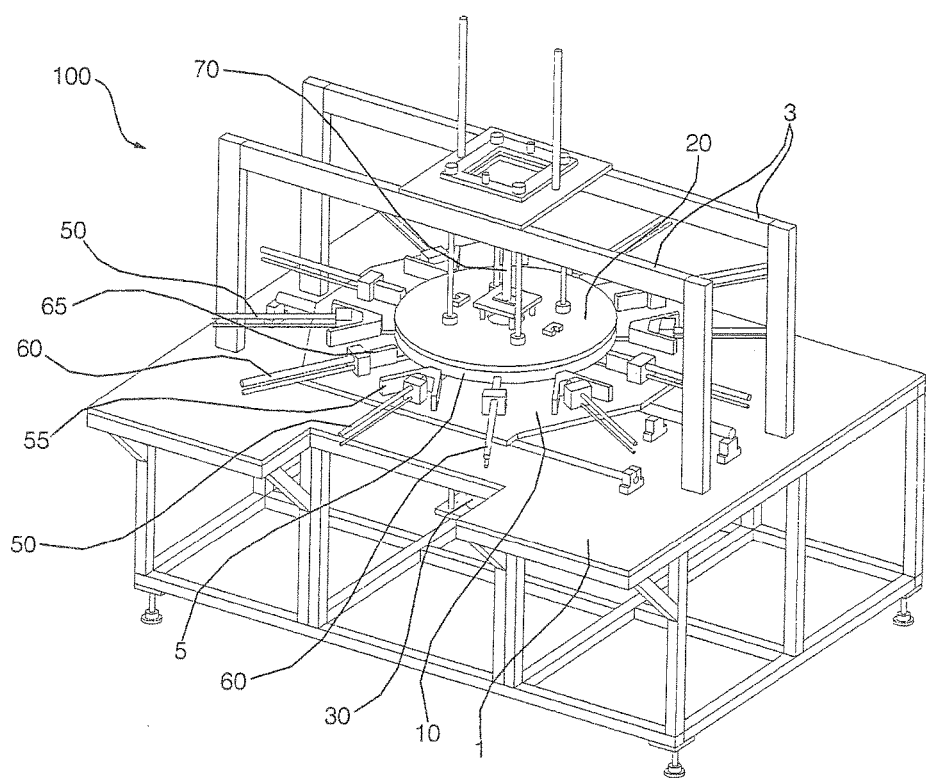
FIG. 2 is a perspective view illustrating the apparatus for folding the driver airbag according to the first exemplary embodiment of the present invention.
Figure 3:
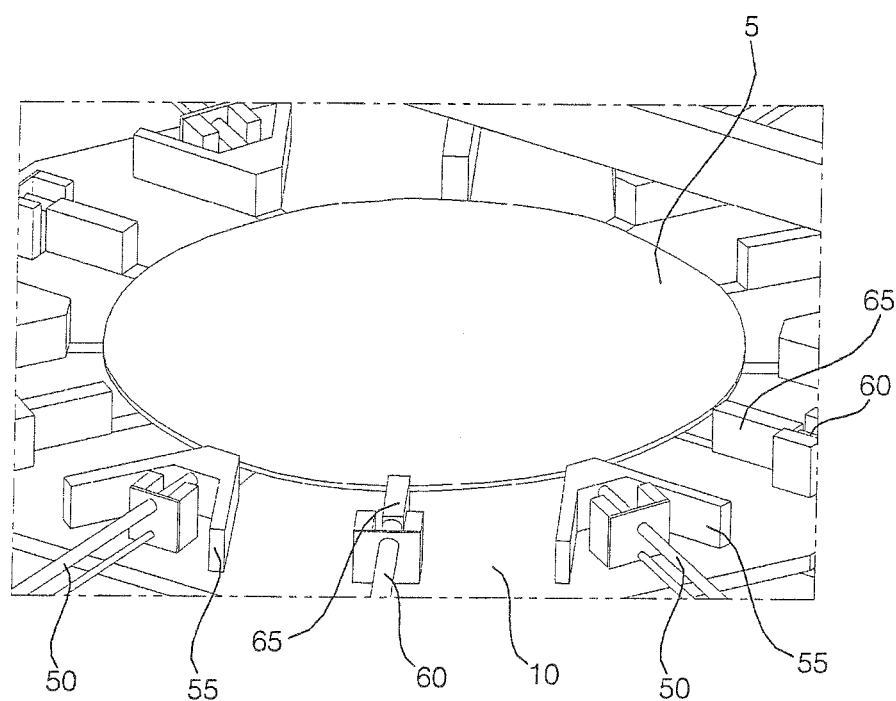
FIG. 3 is a view illustrating a state in which the airbag is placed on a lower plate illustrated in FIG. 2.
Figure 4:
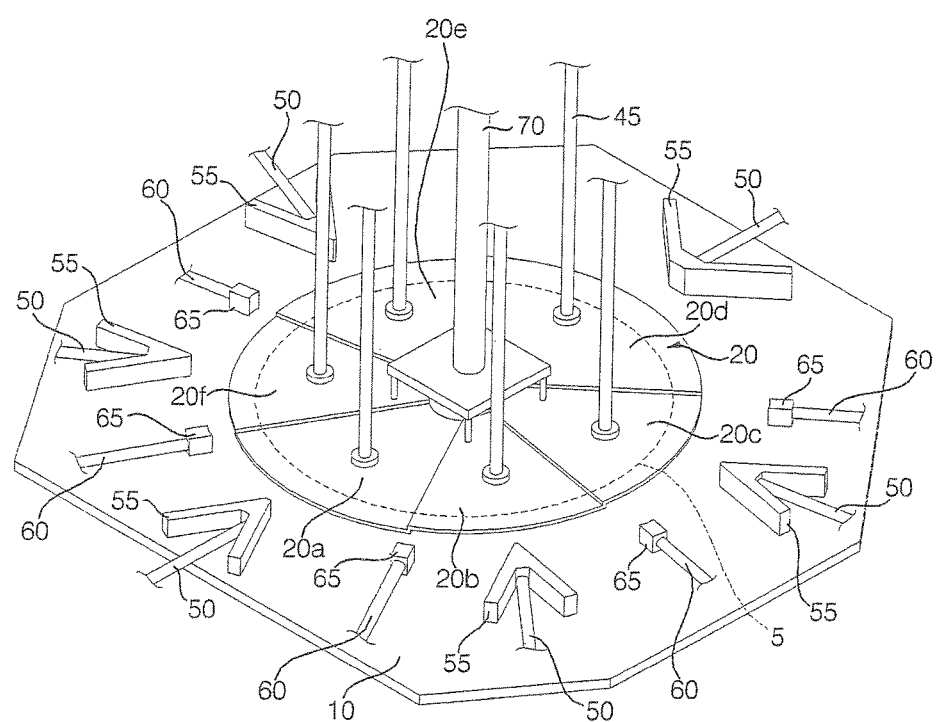
FIG. 4 is a detailed view of an upper plate illustrated in FIG. 2.
Figure 5:
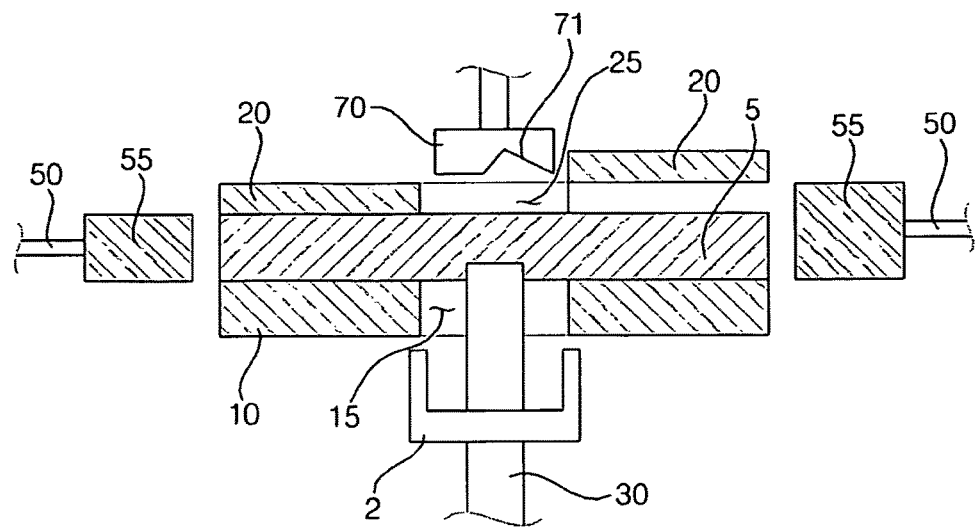
FIG. 5 is a cross-sectional side view illustrating the apparatus for folding the driver airbag according to the first exemplary embodiment of the present invention.
Figure 6:
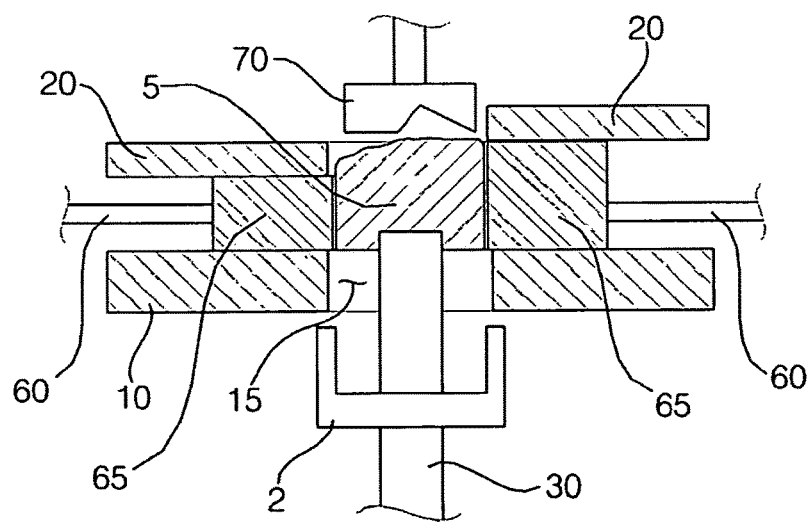
FIG. 6 is a cross-sectional side view illustrating a state in which the airbag is compressed by a second pressing jig of the apparatus for folding the driver airbag according to the first exemplary embodiment of the present invention.
Figure 7:
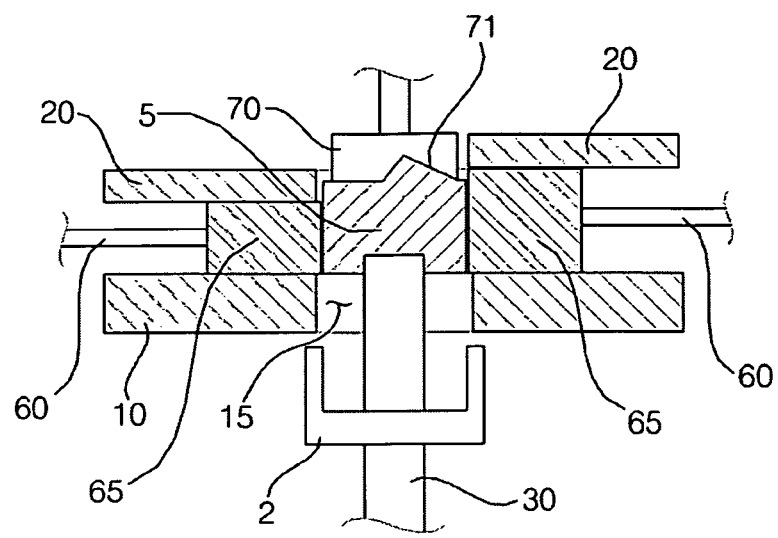
FIG. 7 is a cross-sectional side view illustrating a state in which the airbag is compressed by a pusher of the apparatus for folding the driver airbag according to the first exemplary embodiment of the present invention.
Figure 8:
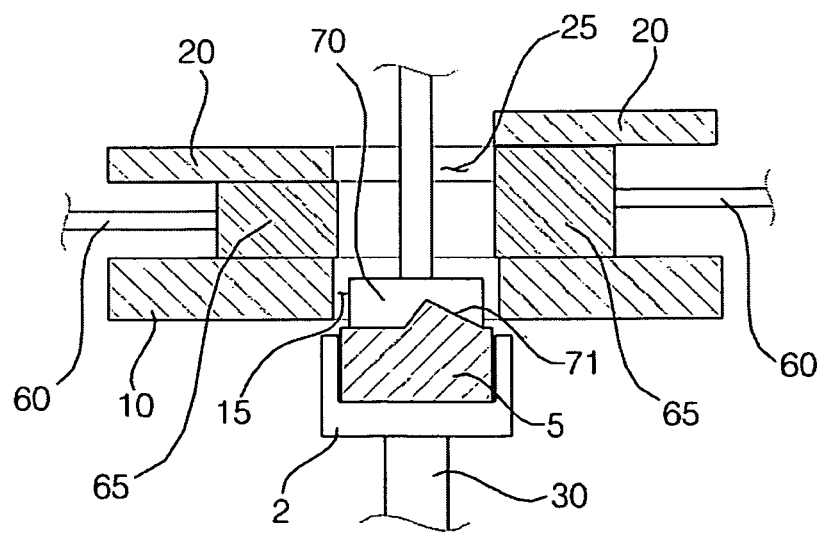
FIG. 8 is a cross-sectional side view illustrating a state in which the airbag folded by the apparatus for folding the driver airbag according to the first exemplary embodiment of the present invention is accommodated in an airbag housing.
Figure 9:
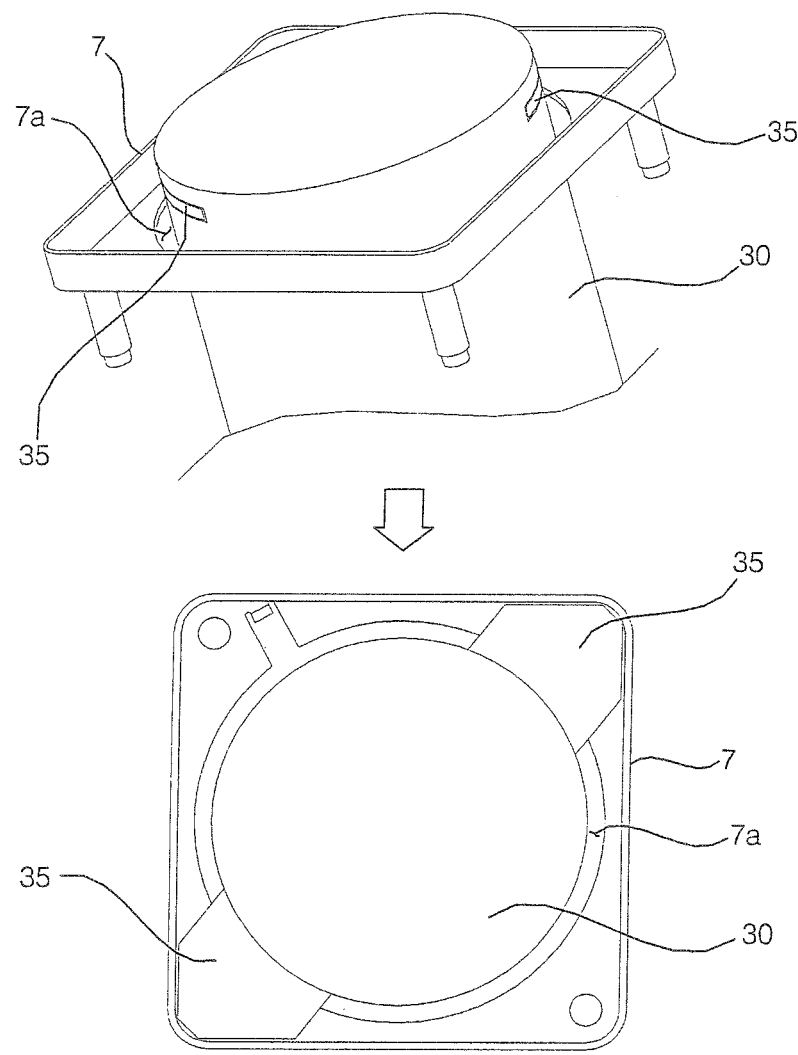
FIG. 9 is a view illustrating a state in which a fixing jig illustrated in FIG. 2 fixes a retainer disposed on the airbag.

Referring to FIGS. 1, 2 and 9, the retainer 7 disposed in the airbag 5 is formed in a quadrangular shape, and the inflator hole 7a is formed at the central portion of the retainer 7. Fixing pins 35, which protrude in a radial direction of the inflator hole 7a to fix the retainer 7, are formed at the upper portion of the fixing jig 30 so that the fixing jig 30 may fix the airbag 5 after being inserted into the inflator hole 7a.

The fixing pins 35 protrude from both sides of the fixing jig 30 and comes into close contact with an edge of the retainer 7, such that the retainer 7 neither moves forward, rearward, leftward or rightward nor rotates. When the retainer 7 is fixed as described above, the central portion of the airbag 5 placed on the lower plate 10 is fixed so as not to move forward, rearward, leftward or rightward and to rotate.

Figure 10:
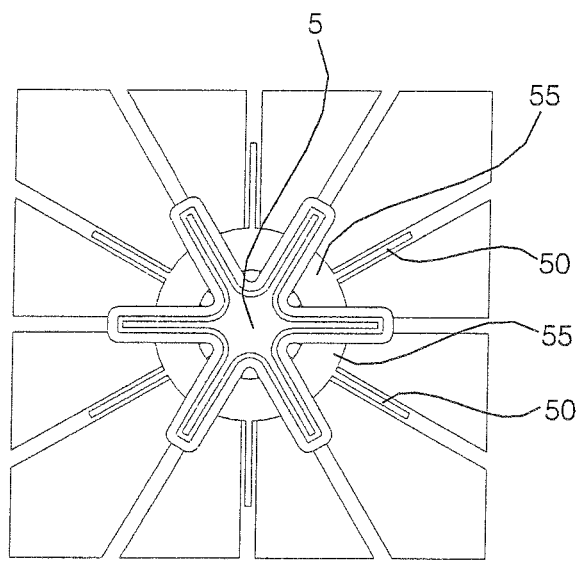
FIG. 10 is a top plan view illustrating a state in which first pressing jigs illustrated in FIG. 2 divide the airbag into a plurality of sections in a circumferential direction.

Referring to FIG. 10, when the upper plate 20 covers the airbag 5 placed on the lower plate 10 in a state in which the upper plate 20 is spaced apart from the airbag 5, the first pressing jigs 50 are first operated, and the first blades 55 are inserted between the upper plate 20 and the lower plate 10 and divide the airbag 5 into the plurality of sections in the circumferential direction by pressing the edge of the airbag 5 inward. The airbag 5 is divided by the first blades 55 into the plurality of sections in the circumferential direction and disposed radially.

Figure 11:
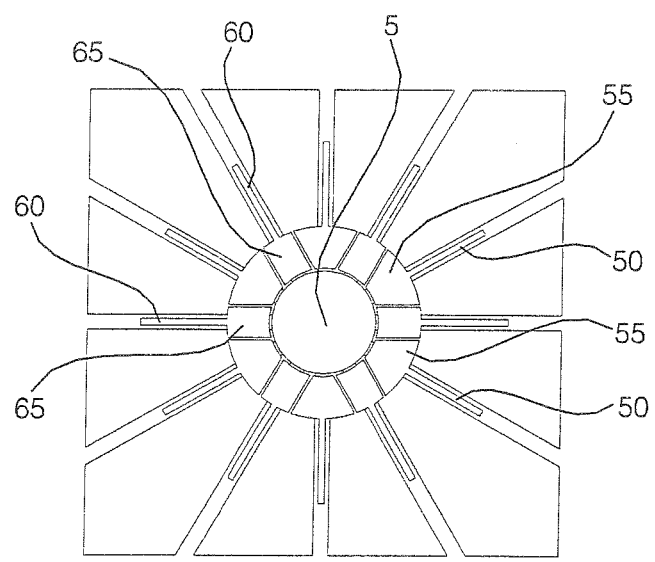
FIG. 11 is a top plan view illustrating a state in which second pressing jigs illustrated in FIG. 2 compress the airbag that is divided into the plurality of sections by the first pressing jigs.

Referring to FIG. 11, after the airbag 5 is divided by the first blades 55 into the plurality of sections in the circumferential direction, the second pressing jigs 60 are operated, and the second blades 65 are inserted between the upper plate 20 and the lower plate 10. The second blades 65 are inserted between the first blades 55 between the upper plate 20 and the lower plate 10, and compresses the airbag 5 by pressing inward the edge of the airbag 5 that is divided into the plurality of sections by the first blades 55.

The apparatus 100 for folding the driver airbag according to the exemplary embodiment of the present invention may change a folded shape of the airbag 5 by changing shapes of the first blades 55 and the second blades 65 and changing movement amounts of the first pressing jigs 50 and the second pressing jigs 60. For example, when the movement amounts of the plurality of first pressing jigs 50 are identical to the movement amounts of the plurality of second pressing jigs 60, the airbag 5 may be compressed to have a circular shape as illustrated in FIG. 11, and then may be accommodated in the airbag housing 2 having a circular accommodating space, and the airbag 5 may be compressed to have a triangular shape by changing the shapes of the first blades 55 and the second blades 65 and changing the movement amounts of the first pressing jigs 50 and the second pressing jigs 60, and then the airbag 5 may be accommodated in the airbag housing 2 having a triangular accommodating space.

As described above, since the airbag 5 is folded to have a shape corresponding to the shape of the accommodating space in the airbag housing 2, there is no vacant space in the airbag housing 2 after the airbag 5 is accommodated in the accommodating space in the airbag housing 2, such that it is possible to improve deployment performance of the airbag 5 and improve quality of an external appearance of the steering wheel by preventing the airbag housing 2 from protruding convexly upward after the airbag 5 is accommodated in the airbag housing 2.

Figure 12:
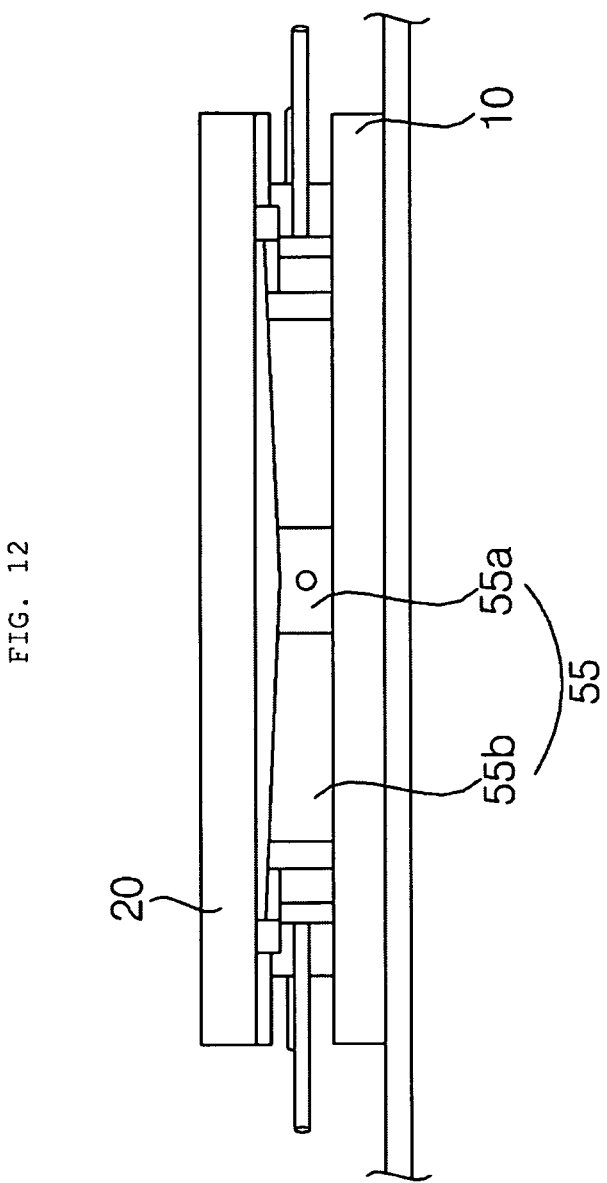
FIG. 12 is a view for explaining a vertical length of a first blade illustrated in FIG. 2.

Referring to FIG. 12, the vertical length of the first blade 55 is gradually increased toward a rear end 55b from the tip 55a that comes into contact with the edge of the airbag 5. Therefore, when the first blades 55 are moved while pressing the edge of the airbag 5 inward, a space into which the airbag 5 is inserted while being folded is present between the upper plate 20 and the first blades 55 or between the lower plate 10 and the first blades 55, thereby preventing the airbag 5 from becoming convex upward.

Figure 13:
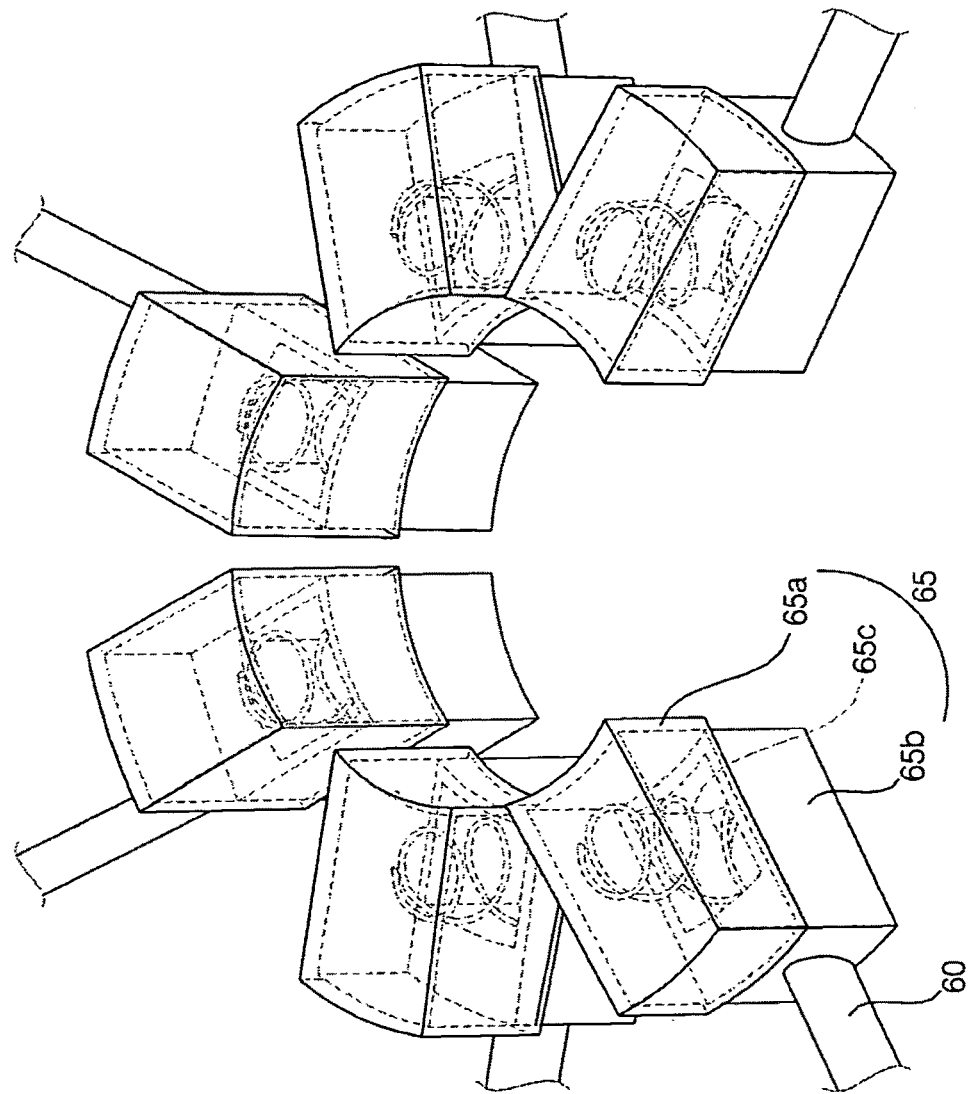
FIG. 13 is a detailed view of a second blade illustrated in FIG. 2.
Figure 14:
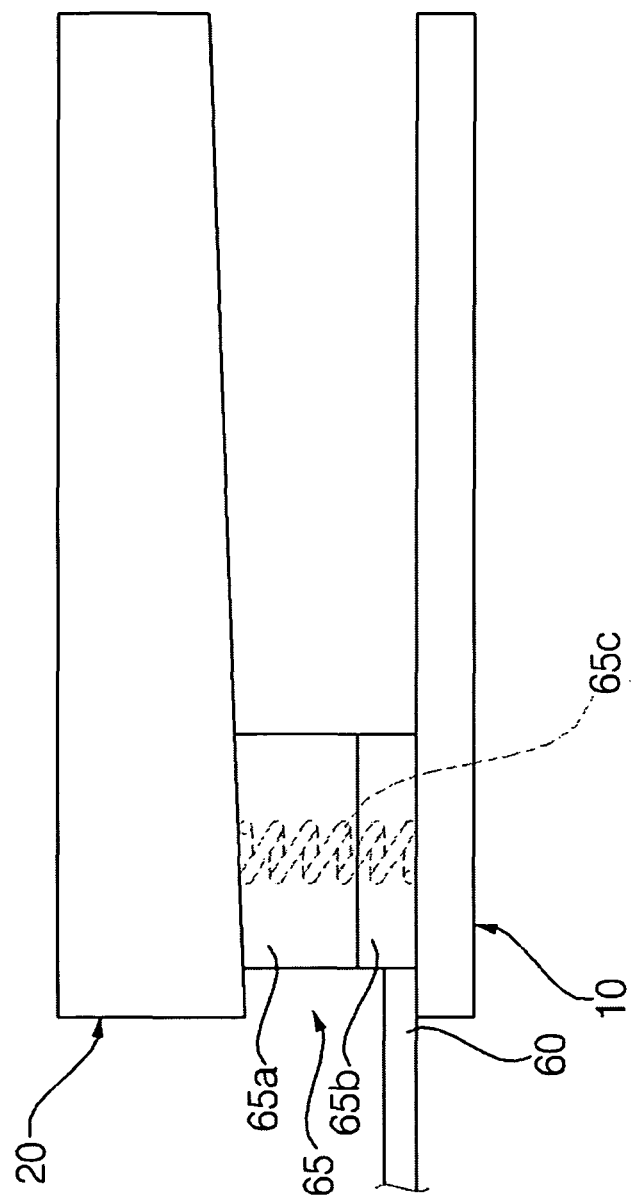
FIG. 14 is a view illustrating an initial state in which the second blade illustrated in FIG. 2 is inserted between the upper plate and the lower plate to compress the airbag.
Figure 15:
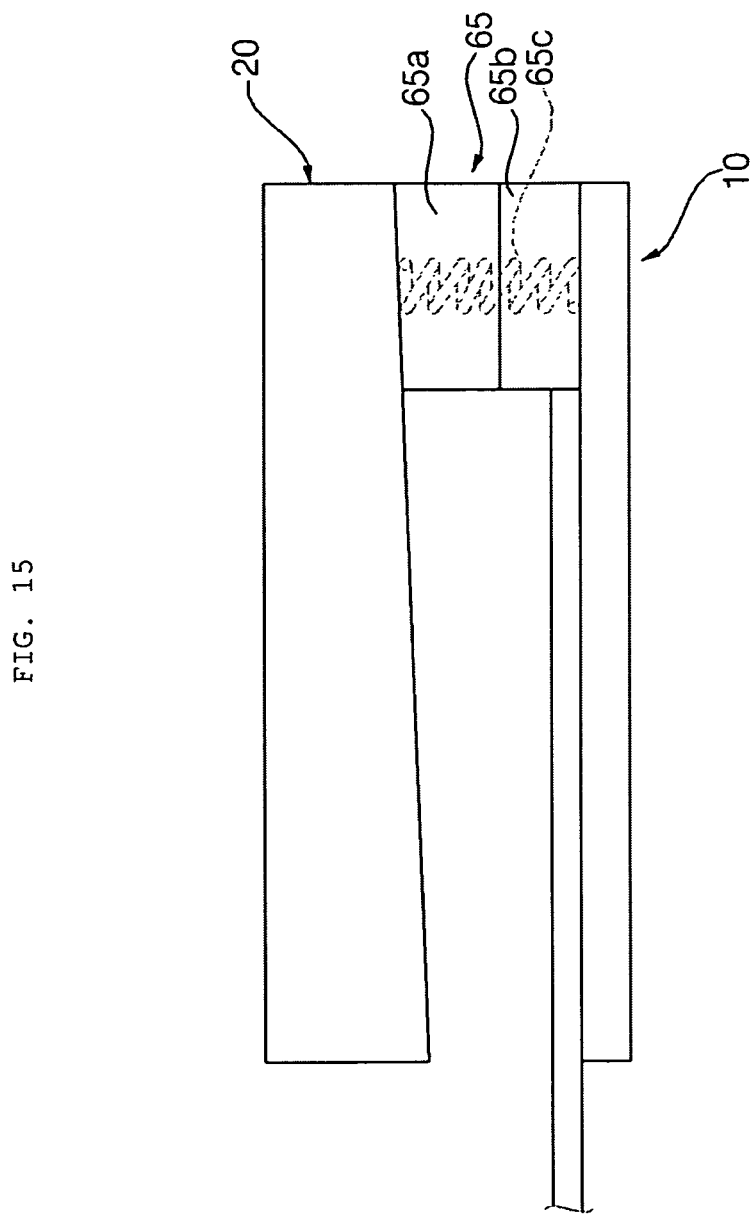
FIG. 15 is a view illustrating a state in which the second blade illustrated in FIG. 2 is moved between the upper plate and the lower plate to compress the airbag.

Referring to FIGS. 13 to 15, the second blade 65, which is disposed at the tip of each of the plurality of second pressing jigs 60, includes an upper blade 65a, a lower blade 65b which is disposed under the upper blade 65a, and an elastic member 65c which provides elastic force to the upper blade 65a and the lower blade 65b so that an upper surface of the upper blade 65a may come into contact with a lower surface of the upper plate 20 and a lower surface of the lower blade 65b may come into contact with the upper surface of the lower plate 10.

The elastic member 65c may be disposed between the upper blade 65a and the lower blade 65b, and may provide elastic force to the upper blade 65a and the lower blade 65b.

The upper blade 65a and the lower blade 65b are formed to have the same shape and opened at one side, and have spaces in which the elastic member 65c may be disposed. The upper blade 65a is formed to be larger in size than the lower blade 65b to shield the opened one side of the lower blade 65b, and vertically slidably coupled to the lower blade 65b while covering the lower blade 65b. The lower blade 65b is coupled to the second pressing jig 60, and when the lower blade 65b is inserted between the upper plate 20 and the lower plate 10 by the second pressing jig 60, the lower blade 65b may be moved in a state in which the lower surface of the lower blade 65 is in contact with the upper surface of the lower plate 10.

The elastic member 65c is formed as a coil spring and disposed in an internal space defined by the upper blade 65a and the lower blade 65b, and the elastic member 65c has an upper end disposed in the upper blade 65a, and a lower end disposed in the lower blade 65b.

Even though the upper plate 20 includes the plurality of stair sections 20a, 20b, 20c, 20d, 20e, and 20f and the stair sections 20a, 20b, 20c, 20d, 20e, and 20f are spaced apart from the lower plate 10 at different vertical distances, the upper blade 65a is moved upward from the lower blade 65b by the elastic force provided by the elastic member 65c, and as a result, the upper surface of the upper blade 65a may come into close contact with the lower surface of the upper plate 20.

Meanwhile, the upper plate 20 may be formed so that the vertical distance at which the upper plate 20 is spaced apart from the lower plate 10 is gradually increased from an edge toward a center of the upper plate 20. Therefore, when the first blades 55 are moved while pressing the edge of the airbag 5 inward, a space into which the airbag 5 is inserted while being folded is present between the upper plate 20 and the first blade 55, thereby preventing the airbag 5 from becoming convex upward.

Even though the upper plate 20 is formed so that the vertical distance at which the upper plate 20 is spaced apart from the lower plate 10 is gradually increased from the edge toward the center of the upper plate 20, the upper blade 65a is moved upward from the lower blade 65b by the elastic force provided by the elastic member 65c, and as a result, the upper surface of the upper blade 65a may come into close contact with the lower surface of the upper plate 20.

An operation of the apparatus for folding the driver airbag according to the first exemplary embodiment of the present invention, which is configured as described above, will be described below. Here, the operation of the apparatus for folding the driver airbag will be described together with a method of folding the driver airbag according to the first exemplary embodiment of the present invention.

Figure 16:
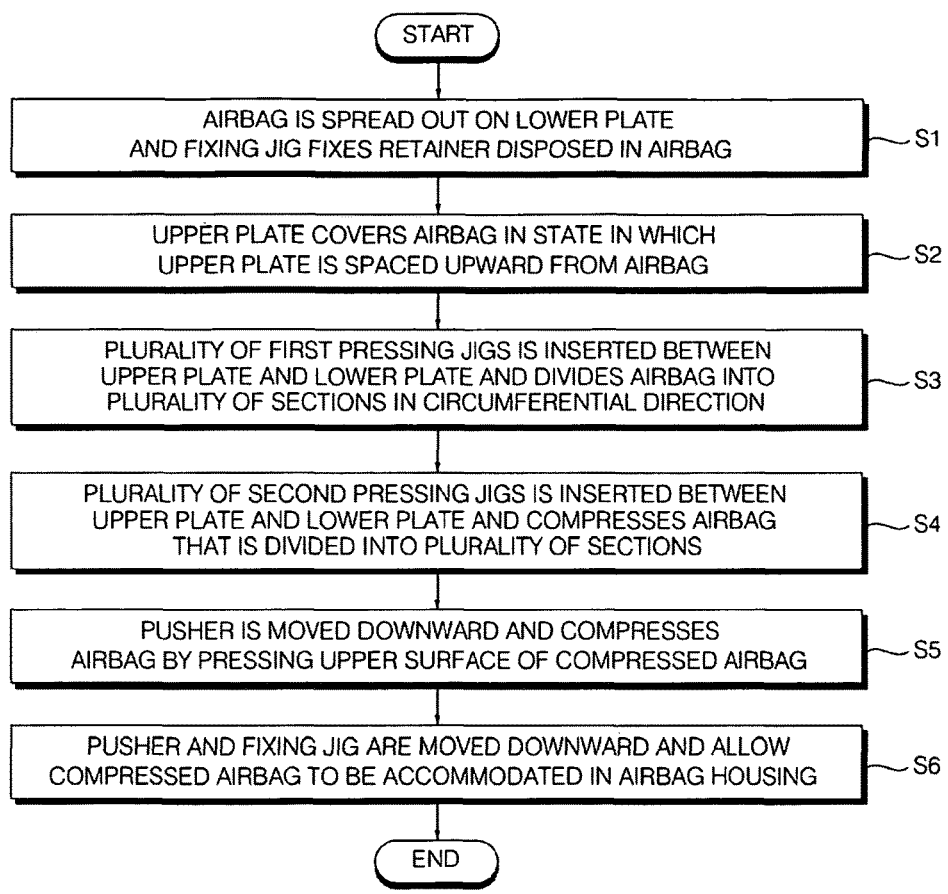
FIG. 16 is a flowchart of a method of folding the driver airbag according to the first exemplary embodiment of the present invention.

Referring to FIG. 16, in a first step S1, the airbag 5 is spread out on a lower plate 10, and the fixing jig 30 fixes the retainer 7 disposed in the airbag 5. The upper portion of the fixing jig 30 passes through the airbag housing 2, and is inserted sequentially into the fixing jig hole 15 formed in the lower plate 10 and the inflator hole 7a formed in the retainer 7, and thereafter, the fixing pins 35, which are disposed at the upper portion of the fixing jig 30, protrude from the inside of the fixing jig 30 in the radial direction to fix the retainer 7, thereby fixing the central portion of the airbag 5.

In a second step S2, the upper plate 20 is moved downward, and covers the airbag 5 in a state in which the upper plate 20 is spaced upward from the airbag 5.

In a third step S3, the plurality of first pressing jigs 50 is inserted between the upper plate 20 and the lower plate 10, and the first blades 55 disposed on the plurality of first pressing jigs 50 divide the airbag 5 into the plurality of sections in the circumferential direction by pressing the edge of the airbag 5 inward.

In a fourth step S4, the plurality of second pressing jigs 60 is inserted between the upper plate 20 and the lower plate 10, and the second blades 65 disposed on the plurality of second pressing jigs 60 compress the airbag 5 by pressing inward the edge of the airbag 5 that is divided into the plurality of sections.

In a fifth step S5, the pusher 70 is moved downward, and compresses the airbag 5 by pressing the upper surface of the compressed airbag 5. The lower portion of the pusher 70 is inserted into the pusher hole 25 formed in the upper plate 20 and may press the upper surface of the compressed airbag 5. As the pusher 70 compresses the airbag 5 as described above, the process of folding the airbag 5 is completed.

In a sixth step S6, the pusher 70 and the fixing jig 30 are moved downward simultaneously and allow the compressed airbag 5 to be accommodated in the airbag housing 2. Since the airbag 5 is disposed between the pusher 70 and the fixing jig 30, the airbag 5 may be guided by the pusher 70 and the fixing jig 30 and moved into the airbag housing 2 while maintaining the compressed shape.

After the sixth step S6, the fixing pin 35 is inserted back into the fixing jig 30 to release the retainer 7. Thereafter, an operator may withdraw the airbag housing 2 from the fixing jig 30.

An apparatus for folding a driver airbag according to a second exemplary embodiment of the present invention will be described below. Hereinafter, like reference numerals refer to constituent elements identical to those of the aforementioned first exemplary embodiment, a description thereof will be omitted, and only the differences between the exemplary embodiments will be described.

Figure 17:
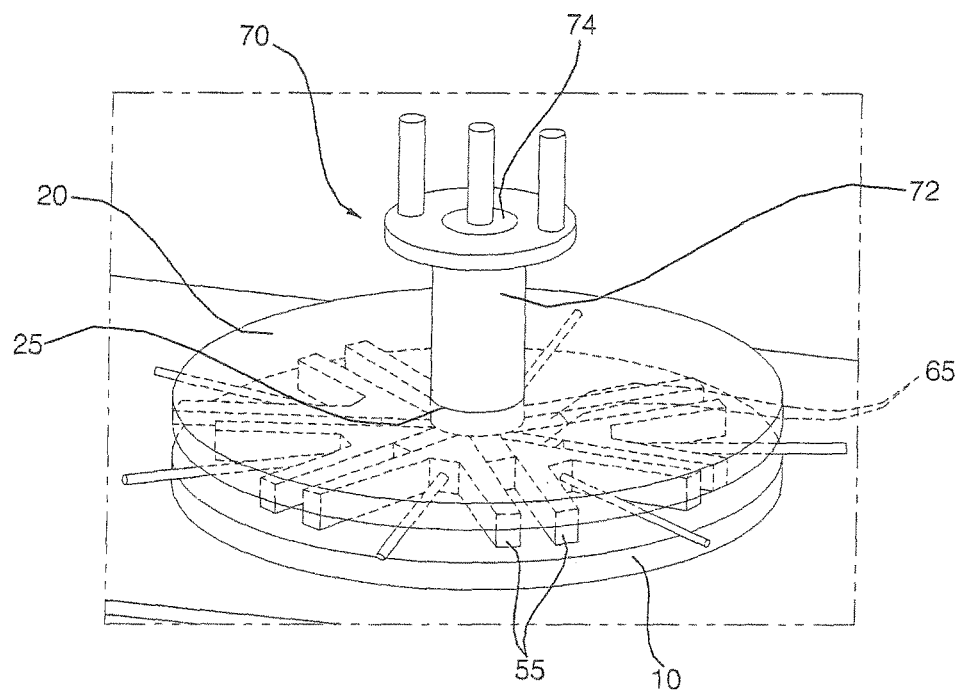
FIG. 17 is a view illustrating a main part of an apparatus for folding a driver airbag according to a second exemplary embodiment of the present invention.
Figure 18:
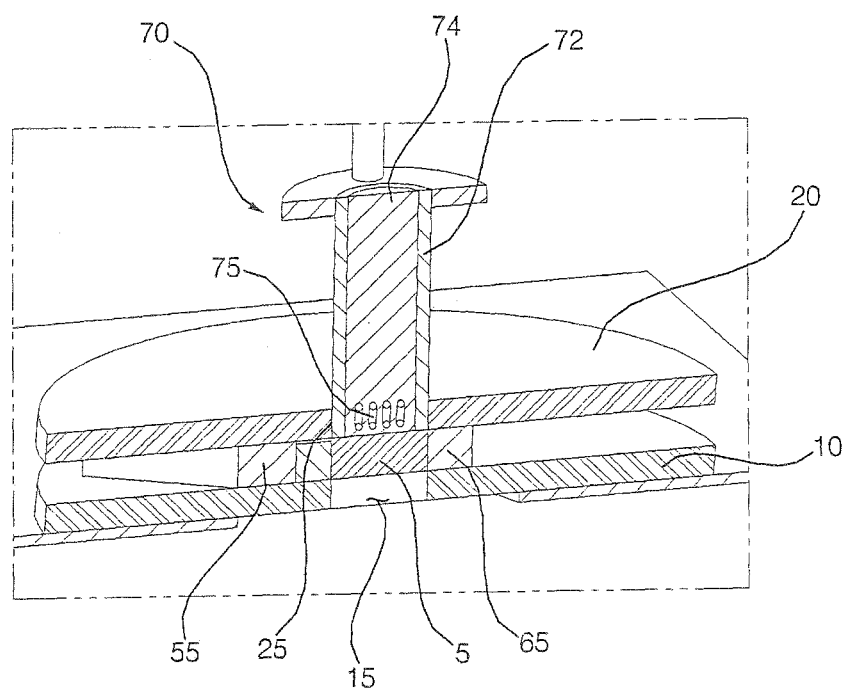
FIG. 18 is a view illustrating an initial state when the airbag is compressed by a pusher of the apparatus for folding the driver airbag according to the second exemplary embodiment of the present invention.
Figure 19:
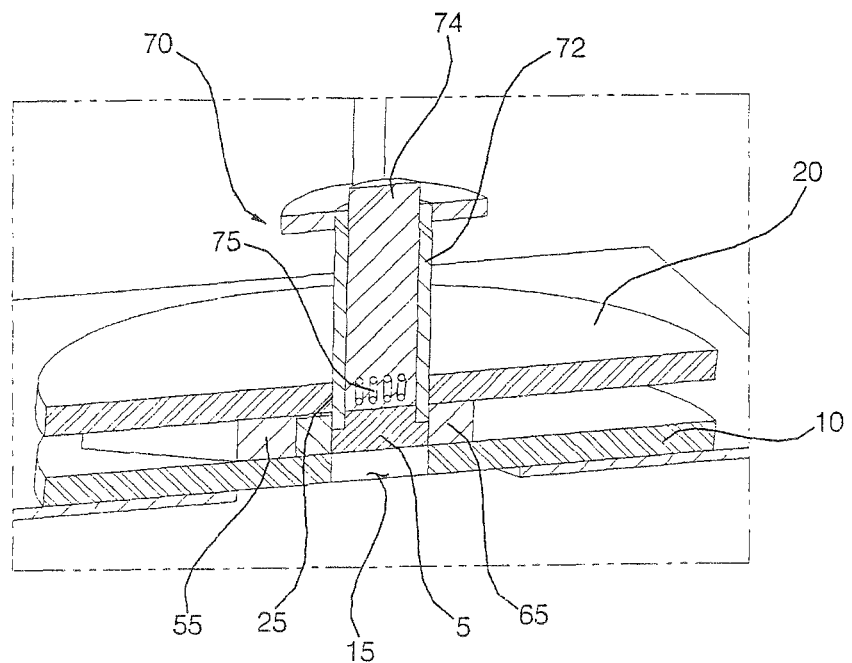
FIG. 19 is a view illustrating a late state when the airbag is compressed by the pusher of the apparatus for folding the driver airbag according to the second exemplary embodiment of the present invention.

Referring to FIGS. 17 to 19, unlike the aforementioned first exemplary embodiment, the apparatus for folding the driver airbag according to the second exemplary embodiment of the present invention includes two pushers 70 that press the upper surface of the airbag 5 compressed by the second pressing jigs 60. That is, the pushers 70 include an outer pusher 72, and an inner pusher 74.

The outer pusher 72 is installed to be vertically slidable relative to the inner pusher 74. A heating element 75 is disposed in the inner pusher 74. The heating element 75 may be formed in a coil shape.

After the airbag 5 is compressed by the second pressing jig 60, the outer pusher 72 and the inner pusher 74 are moved downward simultaneously and press the upper surface of the airbag 5. In this case, the inner pusher 74 compresses the airbag 5 while providing the airbag 5 with heat transferred from the heating element 75, thereby preventing the airbag 5 from becoming convex upward.

The outer pusher 72 is further moved downward than the inner pusher 74 and presses the edge of the airbag 5 compressed by the second pressing jigs 60. Therefore, the edge of the airbag 5 compressed by the second pressing jigs 60 is further compressed downward than the central portion of the airbag 5.

Figure 20:
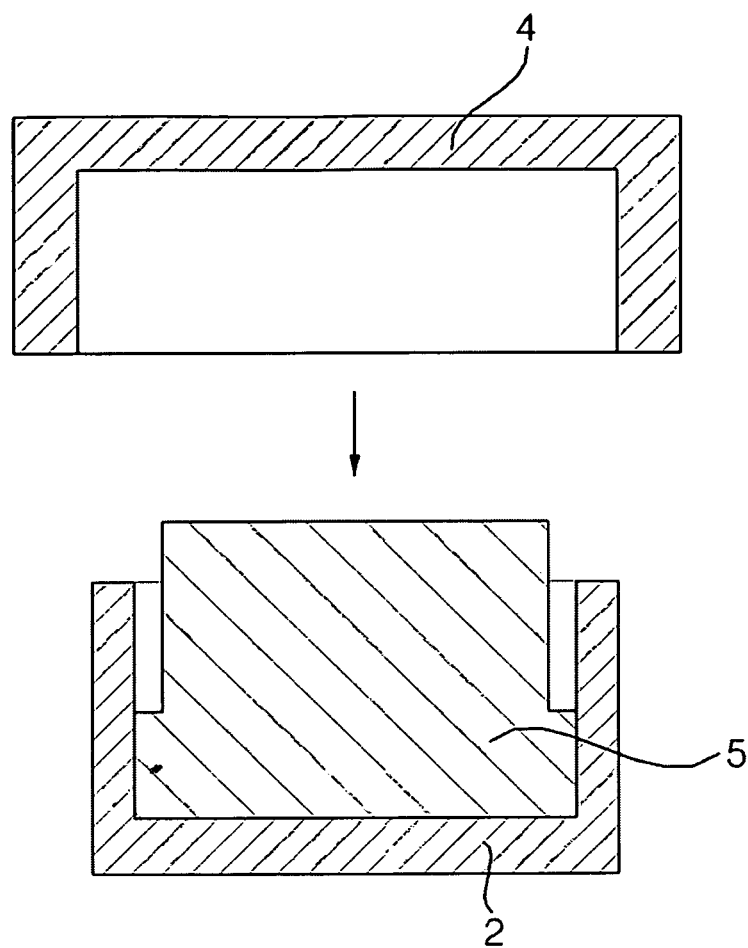
FIG. 20 is a view illustrating a state in which the airbag folded by the apparatus for folding the driver airbag according to the second exemplary embodiment of the present invention is accommodated in an airbag housing.
Figure 21:
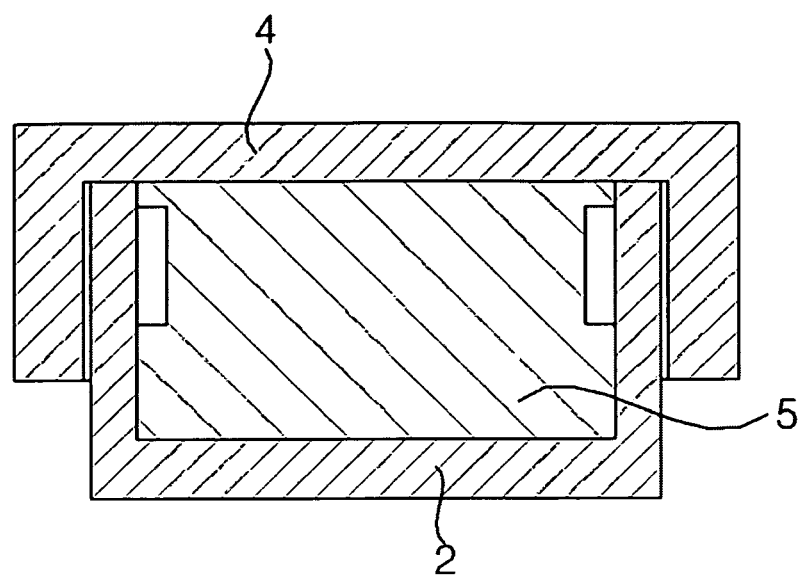
FIG. 21 is a view illustrating a state in which the airbag folded by the apparatus for folding the driver airbag according to the second exemplary embodiment of the present invention is shielded by an airbag cover after being accommodated in the airbag housing.

Referring to FIGS. 20 and 21, the outer pusher 72, the inner pusher 74, and the fixing jig 30 are moved downward simultaneously, such that the airbag 5 is accommodated in the airbag housing 2 while maintaining the folded shape.

Since an upper portion of the airbag housing 2 is opened, the opened upper portion of the airbag housing 2 needs to be shielded by the airbag cover 4. In this case, since the edge of the airbag 5 is further compressed downward by the outer pusher 72 than the central portion of the airbag 5, the edge of the airbag 5 is not interposed between the airbag housing 2 and the airbag cover 4 when the airbag cover 4 is coupled to the airbag housing 2.

A method of folding the driver airbag according to the second exemplary embodiment of the present invention is identical to the method according to the aforementioned first exemplary embodiment except for a fifth step S5 and a sixth step S6.

Therefore, only the fifth step S5 and the sixth step S6 of the method of folding the driver airbag according to the second exemplary embodiment of the present invention will be described.

In the fifth step S5, the outer pusher 72 and the inner pusher 74 are moved downward simultaneously, and primarily compresses the airbag 5 by pressing the upper surface of the airbag 5 compressed by the second pressing jigs 60. In this case, the inner pusher 74 compresses the airbag 5 while providing the airbag 5 with heat transferred from the heating element 75. Thereafter, the inner pusher 74 is maintained as it is, and only the outer pusher 72 is moved downward and compresses the airbag 5 by pressing the edge of the airbag 5 downward.

In the sixth step S6, the outer pusher 72, the inner pusher 74, and the fixing jig 30 are moved downward simultaneously, and allow the compressed airbag 5 to be accommodated in the airbag housing 2.

As described above, according to the apparatus and the method for folding the driver airbag according to the exemplary embodiments of the present invention, the airbag 5 may be folded to have a shape corresponding to the shape of the accommodating space in the airbag housing 2.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. An apparatus for folding a driver airbag, comprising:
a lower plate on which an airbag to be folded is placed and which is formed to be flat;
an upper plate which covers the airbag placed on the lower plate in a state in which the upper plate is spaced upward from the airbag;
a plurality of first pressing jigs which are inserted between the upper plate and the lower plate and divide the airbag into a plurality of sections in a circumferential direction by pressing an edge of the airbag inward; and
a plurality of second pressing jigs which are inserted between the upper plate and the lower plate and compress the airbag by pressing inward the edge of the airbag that is divided into the plurality of sections by the plurality of first pressing jigs,
wherein the upper plate includes a plurality of stair sections that are spaced apart from the lower plate at different vertical distances, and a step formed by two adjacent stair section along a radial direction of the upper plate and forming a border of the two adjacent stair sections.

2. The apparatus of claim 1, wherein a first blade, which presses the edge of the airbag inward, is disposed at a tip of each of the plurality of first pressing jigs, and the first blades disposed at the tips of the plurality of first pressing jigs are formed to have vertical lengths corresponding to the vertical distances at which the plurality of stair sections are spaced apart from the lower plate.

3. The apparatus of claim 2, wherein the vertical length of the first blade disposed at the tip of each of the plurality of first pressing jigs is gradually increased from a tip toward a rear end of the first blade.

4. The apparatus of claim 1, wherein the vertical distance at which the upper plate is spaced apart from the lower plate is gradually increased from an edge toward a center of the upper plate.

5. The apparatus of claim 1, wherein a fixing jig hole is formed in the lower plate, and the apparatus further includes a fixing jig which has an upper portion that is inserted into the fixing jig hole and fixes the airbag placed on the lower plate.

6. The apparatus of claim 5, wherein the upper portion of the fixing jig passes through an airbag housing, which accommodates the airbag, and is inserted into the fixing jig hole.

7. The apparatus of claim 5, wherein a fixing pin, which protrudes from the inside of the upper portion of the fixing jig and fixes the airbag, is disposed at the upper portion of the fixing jig.

8. The apparatus of claim 7, wherein the fixing pin fixes a retainer that is disposed in the airbag to couple the airbag to the airbag housing.

9. The apparatus of claim 1, wherein a pusher hole is formed in the upper plate, and the apparatus further includes a pusher which has a lower portion that is inserted into the pusher hole and compresses the airbag by pressing an upper surface of the airbag compressed by the second pressing jigs.

10. The apparatus of claim 9, wherein at least one recessed portion is formed in the lower surface of the pusher.

11. The apparatus of claim 9, wherein the pusher includes an outer pusher, and an inner pusher disposed in the outer pusher, and the outer pusher presses the edge of the airbag compressed by the second pressing jigs.

12. The apparatus of claim 11, wherein the outer pusher is further moved downward than the inner pusher and presses the edge of the airbag compressed by the second pressing jigs.

13. The apparatus of claim 11, wherein a heating element is disposed in the inner pusher, and the inner pusher compresses the airbag while providing the airbag with heat transferred from the heating element.

14. The apparatus of claim 1, wherein the plurality of first pressing jigs and the plurality of second pressing jigs are alternately disposed in the circumferential direction of the airbag.

15. An apparatus for folding a driver airbag, comprising:
a lower plate on which an airbag to be folded is placed and which is formed to be flat;

an upper plate which covers the airbag placed on the lower plate in a state in which the upper plate is spaced upward from the airbag;

a plurality of first pressing jigs which are inserted between the upper plate and the lower plate and divide the airbag into a plurality of sections in a circumferential direction by pressing an edge of the airbag inward; and a plurality of second pressing jigs which are inserted between the upper plate and the lower plate and compress the airbag by pressing inward the edge of the airbag that is divided into the plurality of sections by the plurality of first pressing jigs, wherein the upper plate includes a plurality of stair sections that are spaced apart from the lower plate at different vertical distances, wherein a second blade, which presses the edge of the airbag inward, is disposed at a tip of each of the plurality of second pressing jigs, and the second blade disposed at the tip of each of the plurality of second pressing jigs includes:

an upper blade which comes into contact with the upper plate;

a lower blade which comes into contact with the lower plate; and an elastic member which provides elastic force to the upper blade and the lower blade so that the upper blade comes into contact with the upper plate and the lower blade comes into contact with the lower plate.

16. The apparatus of claim 15, wherein the upper blade is slidably coupled to the lower blade.

17. The apparatus of claim 15, wherein the elastic member is disposed between the upper blade and the lower blade.

* * * * *